US005680421A

United States Patent [19]

Shiino et al.

[11] Patent Number: 5,680,421

[45] Date of Patent: Oct. 21, 1997

[54] FRAME SYNCHRONIZATION APPARATUS

[75] Inventors: Haruhiro Shiino; Norio Yamaguchi; Toshimichi Naoi; Ryoichi Miyamoto, all of Tokyo, Japan

[73] Assignee: Oki Electric Industry Co., Ltd., Tokyo, Japan

[21] Appl. No.: 604,832

[22] Filed: Feb. 22, 1996

[30] Foreign Application Priority Data

| | | | |
|---|---|---|---|
| Feb. 27, 1995 | [JP] | Japan | 7-038648 |
| Feb. 27, 1995 | [JP] | Japan | 7-038649 |

[51] Int. Cl.⁶ .......... H04L 7/00

[52] U.S. Cl. .......... 375/368; 370/350; 370/470

[58] Field of Search .......... 375/368, 365, 375/366; 370/105.1, 84, 82, 100.1, 105, 105.4, 280, 294, 324, 337, 344, 350, 470, 472, 503, 514

[56] References Cited

U.S. PATENT DOCUMENTS

| | | | |
|---|---|---|---|
| 5,121,414 | 6/1992 | Levine et al. | 375/96 |
| 5,177,740 | 1/1993 | Toy et al. | 375/368 |
| 5,408,504 | 4/1995 | Ostman | 375/354 |
| 5,539,751 | 7/1996 | Sabel | 375/368 |
| 5,590,160 | 12/1996 | Ostman | 375/367 |

*Primary Examiner*—Stephen Chin
*Assistant Examiner*—Betsy Lee Deppe
*Attorney, Agent, or Firm*—Rabin, Champagne & Lynt, P.C.

[57] ABSTRACT

A frame synchronization apparatus is applied to the TDMA (Time Division Multiple Access) communication system, particularly, where a plurality of transmission rates are available. The frame synchronization apparatus calculates correlations between sampled sequences of a received signal and an assigned sync sequence during the longest or shortest frame period in the plurality of transmission rates. The apparatus stores positions where the correlations exceed a given threshold. Then, the apparatus sets a search gate at a position after a lapse of the longest or shortest frame period from each of those positions. The apparatus calculates correlations between the sync sequence and sampled sequences of the received signal for all the search gates. The actual transmission rate is determined from the plurality of transmission rates based on a time interval of positions where the correlations beyond a second threshold were detected. Synchronization is thus established.

15 Claims, 10 Drawing Sheets

FRAME SYNCHRONIZATION APPARATUS

FIELD OF THE INVENTION

The present invention relates to a frame synchronization apparatus for use in a TDMA (Time Division Multiple Access) cellular radiotelephone system.

DESCRIPTION OF THE RELATED ART

Following an increase in the number of subscribers to the portable telephone service, it has been required to use frequencies more effectively. The TDMA (Time Division Multiple Access) is one of the techniques for that purpose. In the TDMA communication system, each frame is divided into a plurality of time slots. Each subscriber receives and transmits a radio signal using a time slot in each frame assigned from a base station so that one channel is shared by a plurality of subscribers.

At the head of each time slot is arranged a known pattern called a sync sequence for identification of the slot. This sync sequence is set to have excellent self-correlation and cross correlation. Specifically, a large correlation is obtained between the same or similar sync sequences, while a small correlation is obtained between different sync sequences. By calculating a correlation between a sync sequence of the time slot assigned by the base station (hereinafter referred to as "assigned sync sequence") and a sampled sequence of a received signal, each terminal detects a precise position of the slot in the frame.

However, in the actual system, it is possible that the accuracy of detection is lowered due to the Doppler shift of frequency or multipath fading. It is also possible that the accuracy of sync detection is lowered upon occurrence of the frequency offset. In order to compensate for the frequency offset, a method is used as disclosed, for example, in U.S. Pat. No. 5,121,414, which discloses one method for compensate the frequency offset. For enhancing the accuracy of sync detection it is preferable that the detection of the time slot 1s performed plural times. As an actual procedure, correlations between an assigned sync sequence and sampled sequences of the received signal are first calculated continuously so as to detect a timing assumed to be a position of the assigned slot In the frame. Subsequently, centering around a time point after a lapse of one frame period from the detected timing, the correlation of the received signal before and after such a time point is calculated. Based on this detection of the correlation, the prior detected timing is corrected so as to determine a head position of the frame.

On the other hand, as a voice coding method applied to the TDMA cellular radiotelephone system, a half-rate transmission mode has been adopted in addition to a full-rate transmission mode which has been available heretofore. This means that a plurality of transmission rates will be available in the TDMA service for the future.

FIGS. 1(*a*) and 1(*b*) show examples of frame formats in the full-rate and half-rate transmission modes, respectively. As shown in the figures, each frame is divided into three time slots in the full-rate mode, while each frame is divided into six time slots in the half-rate mode. In the TDMA system, a transmission rate per channel is defined by a transmission bit rate and the number of slots per frame assigned to one channel. In the system having a plurality of transmission rates, as shown in FIGS. 1(*a*) and 1(*b*), it is convenient not to change the transmission bit rate or the time slot format, but to change a frame period by increasing or decreasing the number of slots assigned to one channel.

However, in the conventional frame synchronization method, it is premised that the transmission rate, that is, the frame period, is a known single value. It is thus possible that the frame synchronization is wrongly established if a plurality of transmission rates exist, and further, if a current transmission rate is known after a line is connected to actually receive a signal. In the examples shown in FIGS. 1(*a*) and 1(*b*), a frame period T2 at a transmission rate B is twice a frame period T1 at a transmission rate A. In the TDMA cellular radiotelephone system standardized in North America, the frame period T1 in the full-rate mode is 20 msec and the frame period T2 in the half-rate mode is 40 msec.

In such a case, correlations between an assigned sync sequence corresponding to a time slot assigned to a mobile station and sampled sequences of the received signal are calculated. For example, when the assigned sync sequence is SYNC1, the calculation result exceeds a certain threshold value at a position of SYNC1 in a frame 1 in FIG. 1(*a*). Using this position as a reference position, correlations are further calculated twice at intervals of frame period of the transmission rate A. If these two calculation results exceed a certain threshold value, respectively, it can be Judged that SYNC1 of a frame 2 and SYNC1 of a frame 3 in FIG. 1(*a*) are detected. Accordingly, it is determined that synchronization is achieved at the transmission rate A. On the other hand, if only the second correlation exceeds the given threshold value, it can be judged that SYNC1 of a frame 2 in FIG. 1(*b*) is detected. Accordingly, it is determined that synchronization is achieved at the transmission rate B. Otherwise, it is determined that no synchronization is achieved. According to this method, synchronization can be established even when a plurality of transmission rates are available. However, in this case, a time required for the correlation between the assigned sync sequence and the sampled sequence of the received signal to first exceed the given threshold value differs depending on a transmission rate applied. Thus, a time required for establishment of frame synchronization is not constant.

SUMMARY OF THE INVENTION

Therefore, it is an object of the present invention to provide a frame synchronization apparatus which can establish a frame synchronization with improved accuracy.

It is another object of the present invention to provide a frame synchronization apparatus in which a time required for establishment of frame synchronization is constant in the TDMA system where a plurality of transmission rates are present.

According to a first aspect of the present invention, a frame synchronization apparatus executes the following processes in the TDMA system where a plurality of transmission rates are available. Specifically, during a longest frame period in the plurality of transmission rates, correlations between sampled sequences of a received signal and an assigned sync sequence are calculated. Then, all positions where the correlations exceed a given threshold are stored (First Search Mode Process). Subsequently, a search gate is set at a position after a lapse of the longest frame period from each of those stored positions. Then, correlations between the sync sequence and sampled sequences of the received signal are calculated for all the search gates, thereby searching for positions where the correlations beyond a second threshold are detected (Second Search Mode Process). Based on a time interval between the positions where the correlations beyond the second threshold were detected, the actual transmission rate is determined from the plurality of transmission rates. Synchronization is thus established (Transmission Rate Determining Process).

According to a second aspect of the present invention, a frame synchronization apparatus executes the following processes in the TDMA system where a plurality of transmission rates are available. Specifically, during a longest frame period in the plurality of transmission rates, correlations between sampled sequences of a received signal and an assigned sync sequence are calculated. Then, all positions where the correlations exceed a given threshold are stored (First Search Mode Process). Subsequently, a search gate is set at a position after a lapse of a shortest frame period from each of those stored positions. Then, correlations between the sync sequence ϕ and sampled sequences of the received signal and correlations between another sync sequence ϕ' and the sampled sequences of the received signal are calculated for all the search gates, thereby searching for positions where the correlations beyond a second threshold are detected (Second Search Mode Process). Based on a time interval between the positions where the correlations beyond the second threshold were detected, the actual transmission rate is determined from the plurality of transmission rates. Synchronization is thus established (Transmission Rate Determining Process).

According to a third aspect of the present invention, a frame synchronization apparatus executes the following processes in the TDMA system where a plurality of transmission rates are available. Specifically, during a shortest frame period in the plurality of transmission rates, correlations between sampled sequences of a received signal and an assigned sync sequence are calculated (First Search Mode Process). If the correlation exceeds a given threshold in a first mode, a search gate is set at a position after a lapse of the shortest frame period from a position where the correlation exceeds the given threshold. Then, a correlation between the sync sequence ϕ and sampled sequences of the received signal and a correlation between another sync sequence ϕ' and the sampled sequences of the received signal are calculated for the set search gate, thereby deriving a maximum value for each of the sync sequences. The thus derived maximum values are compared with a second threshold. If either of the maximum values exceeds a second threshold, it is judged that frame synchronization is established, thereby determining the actual transmission rate.

DESCRIPTION OF THE PREFERRED EMBODIMENT

Figure 2:
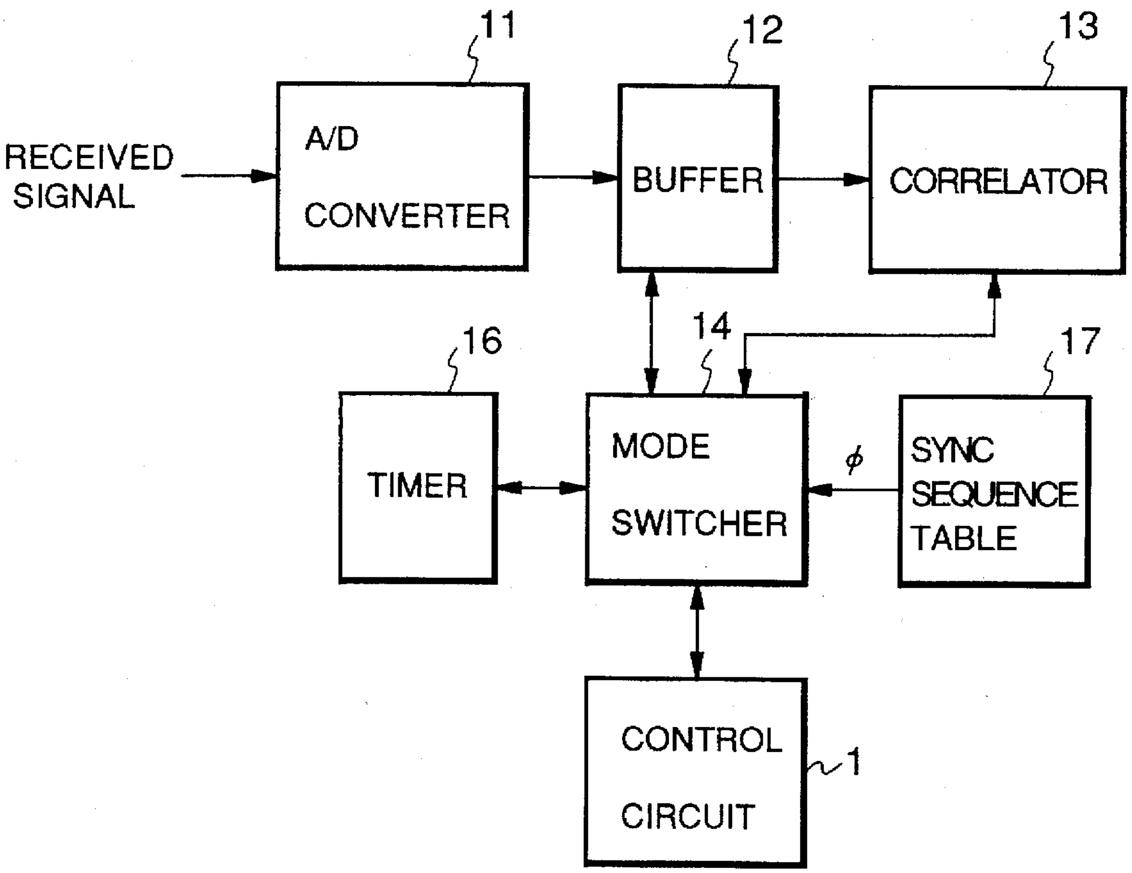
FIG. 2 is a block diagram showing a frame synchronization apparatus according to a first preferred embodiment of the present invention.

FIG. 2 shows a frame synchronization apparatus according to a first preferred embodiment of the present invention. This frame synchronization apparatus is controlled by a control circuit 1.

A signal received from a base station (not shown) is inputted to an A/D converter 11 where the received signal is converted to a digital signal. An output of the A/D converter 11 is connected to a buffer 12.

An output of the buffer 12 is connected to a correlator 13. According to instructions from the buffer 12 and a mode switcher 14, the correlator 13 calculates a correlation between a sampled sequence of the received signal and a sync sequence ϕ.

To the mode switcher 14 is connected a timer 16 for notifying a lapse of a designated time and a sync sequence table 17. In the sync sequence table 17, all sync sequence patterns to be used and an order of transmission of sync sequences to be used at each of a plurality of transmission rates, are stored in advance. Thus, a relative position of an arbitrary sync sequence in the frame can be known.

Figure 1A:
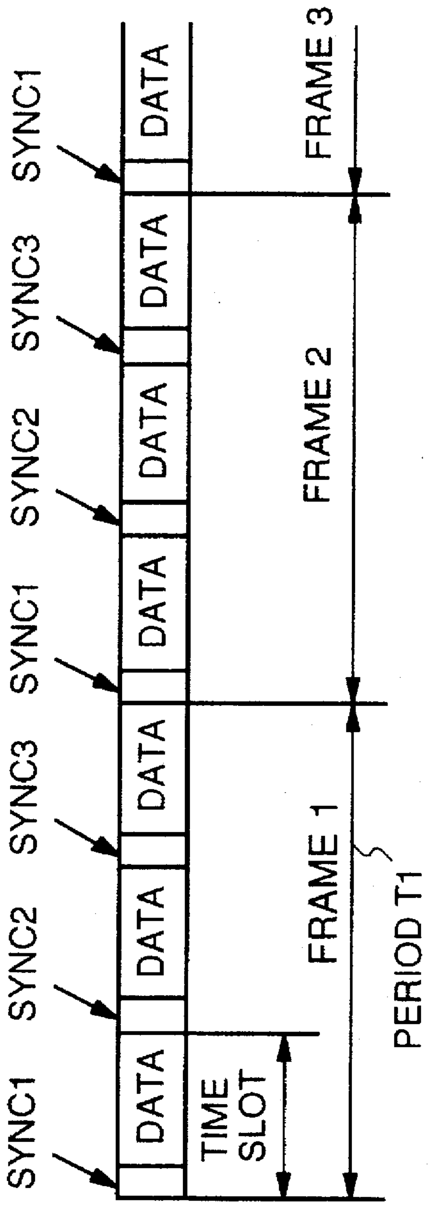
FIGS. 1(*a*) and 1(*b*) are diagrams showing frame formats in the TDMA transmission system, wherein FIG. 1(*a*) shows a frame format in a full-rate transmission mode and FIG. 1(*b*) shows a frame format in a half-rate transmission mode.
Figure 1B:
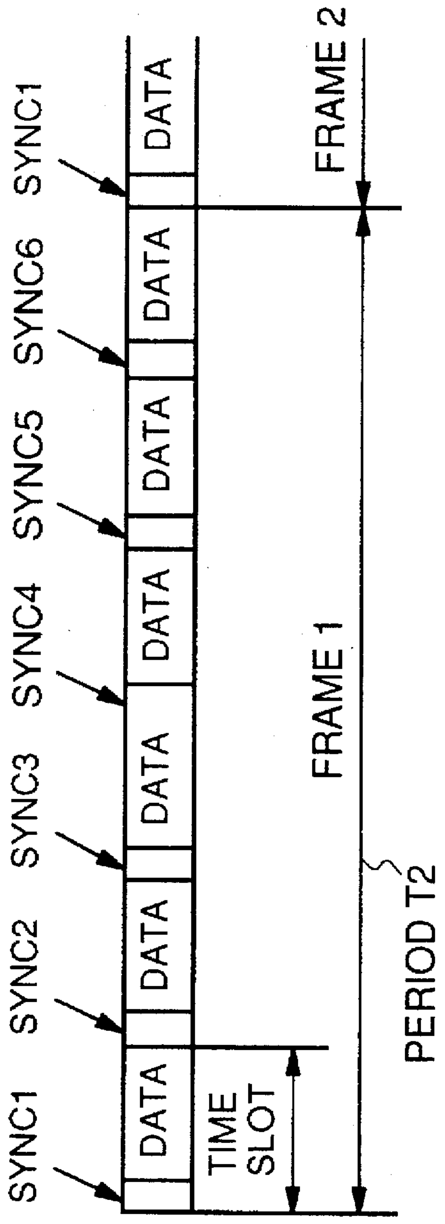

Hereinbelow, an operation of the frame synchronization apparatus shown in FIG. 2 will be described. In this preferred embodiment, it is assumed that two kinds of transmission rates are available as shown in FIG. 1. The notation to be used in the following description Is defined as follows:

(a) one slot time: Ts (b) frame periods T1 and T2 at two transmission rates, respectively:

$$T1 = Ts \times N1$$

$$T2 = Ts \times N2 (T1 \leqq T2)$$

(c) transmission orders of sync sequences transmitted at frame periods T1 and T2, respectively:

$$\phi1 = \{\phi1(0), \phi1(1) \ldots, \phi1(N1-1)\}$$

$$\phi2 = \{\phi2(0), \phi2(2) \ldots, \phi2(N2-1)\}$$

First, data transmitted from a base station (not shown) in the TDMA mode is inputted to the A/D converter 11 via an antenna, an AGC amplifier, an orthogonal detector and the like (not shown) of a mobile station. The received signal inputted to the A/D converter 11 is sampled using a sampling clock (not shown) as a timing signal. The sampled sequence of the received signal is outputted to the buffer 12.

The control circuit 1 instructs the mode switcher 14 to start the frame synchronization. In response to this instruction, the mode switcher 14 is set to a first mode where the mode switcher 14 initializes the buffer 12 and waits until the received signal having a length necessary for calculation of a correlation (for example, a time of data corresponding to the number of symbols forming a sync sequence) is stored in the buffer 12.

Every time a sampled value of the received signal is inputted from the A/D converter 11, the buffer 12 notifies the mode switcher 14. Thus, whether or not the buffer 12 stores a necessary length of data can be determined by counting the number of notifications received by the mode switcher 14 from the buffer 12. The required number of notifications may be set, for example, to the number of symbols of a sync sequence x the number of oversamplings.

When the data is stored in the buffer 12, the mode switcher 14 reads out a pattern of a sync sequence $\phi$ of an assigned slot from the sync sequence table 17 and sets the sync sequence $\phi$ in the correlator 13. Then, the mode switcher 14 instructs the correlator 13 to calculate a correlation between the set sync sequence $\phi$ and the sampled sequence of the received signal.

Every time new received data is inputted to the buffer 12, the correlator 13 calculates the correlation between the sync sequence $\phi$ and a sampled sequence of the received signal in a calculation period. More specifically, every time new received data is inputted to the buffer 12, the correlator 13 shifts a correlation calculation period by a period of the sampling clock and derives a complex correlation of intervals between symbols of the sync sequence $\phi$ and the sampled sequence so as to calculate the correlation. Every time the correlation is derived, the correlator 13 provides notification of a value thereof to the mode switcher 14.

Every time the value of correlation is output from the correlator 13, the mode switcher 14 determines whether the notified value exceeds a preset first threshold. If the correlation exceeds the first threshold, the mode switcher 14 stores a detected position thereof.

The foregoing processes are repeated during the longest frame period in the plurality of transmission rates (hereinafter simply referred to as "longest frame period"). Specifically, in this preferred embodiment, the foregoing processes are repeated during the frame period T2. Meanwhile, hereinafter, the shortest frame period in the plurality of transmission rates will be referred to as "shortest frame period". After a lapse of the longest frame period, the mode switcher 14 is set to a second mode.

In the second mode, the mode switcher 14 first stops the operation of the correlator 13. Thereafter, the mode switcher 14 instructs the correlator 13 to again calculate correlations for all detected positions where the correlations exceed the first threshold in the first mode, centering around time points after a lapse of T2 from the detected positions, respectively. Specifically, a search gate is set at a position centering around a time point after a lapse of T2 from each of the detected positions. The search gate has a given time width across, that is, before and after, the time point after a lapse of T2 from the corresponding detected position. The number of search gates to be set coincides with the number of times where the correlations exceed the first threshold In the first mode.

The mode switcher 14 sets the sync sequence $\phi$ of the assigned slot in the correlator 13. Then, the mode switcher 14 instructs the correlator 13 to calculate correlations between the sync sequence $\phi$ of the assigned slot and sampled sequences of the received signal for calculation periods in all the search gates.

The correlator 13 calculates the correlation between the assigned sync sequence $\phi$ and the sampled sequence of the received signal at each calculation period. This calculation is performed, as in the first mode, shifting the correlation calculation period per period of the sampling clock. Notification of the result is provided to the mode switcher 14. When the correlator 13 finishes the calculations of correlations for the calculation periods in all the search gates, the mode switcher 14 stops the operation of the correlator 13.

Every time the correlation is output from the correlator 13, the mode switcher 14 determines whether a value thereof exceeds a second threshold. The mode switcher 14 monitors a detection interval of correlations exceeding the second threshold. If the received signal was transmitted at the frame period T1, correlations exceeding the first threshold can be detected plural times in the first mode. For example, in case of the transmission rate A shown in FIG. 1(*a*), correlations beyond the first threshold can be detected no less than two times.

From the detection interval of the correlations beyond the second threshold, the frame period is derived and the transmission rate is determined. For example, when the detection intervals are successive, a mean value of the intervals can be determined to be the frame period. Then, the mode switcher 14 notifies the control circuit 1 that the frame synchronization is established. Upon the notification, the determined transmission rate is also provided. Further, a head position of the next frame is calculated and output. If no correlations exceed the second threshold in the second mode, the procedure returns to the first mode to repeat the processes in the first mode.

Figure 3A:
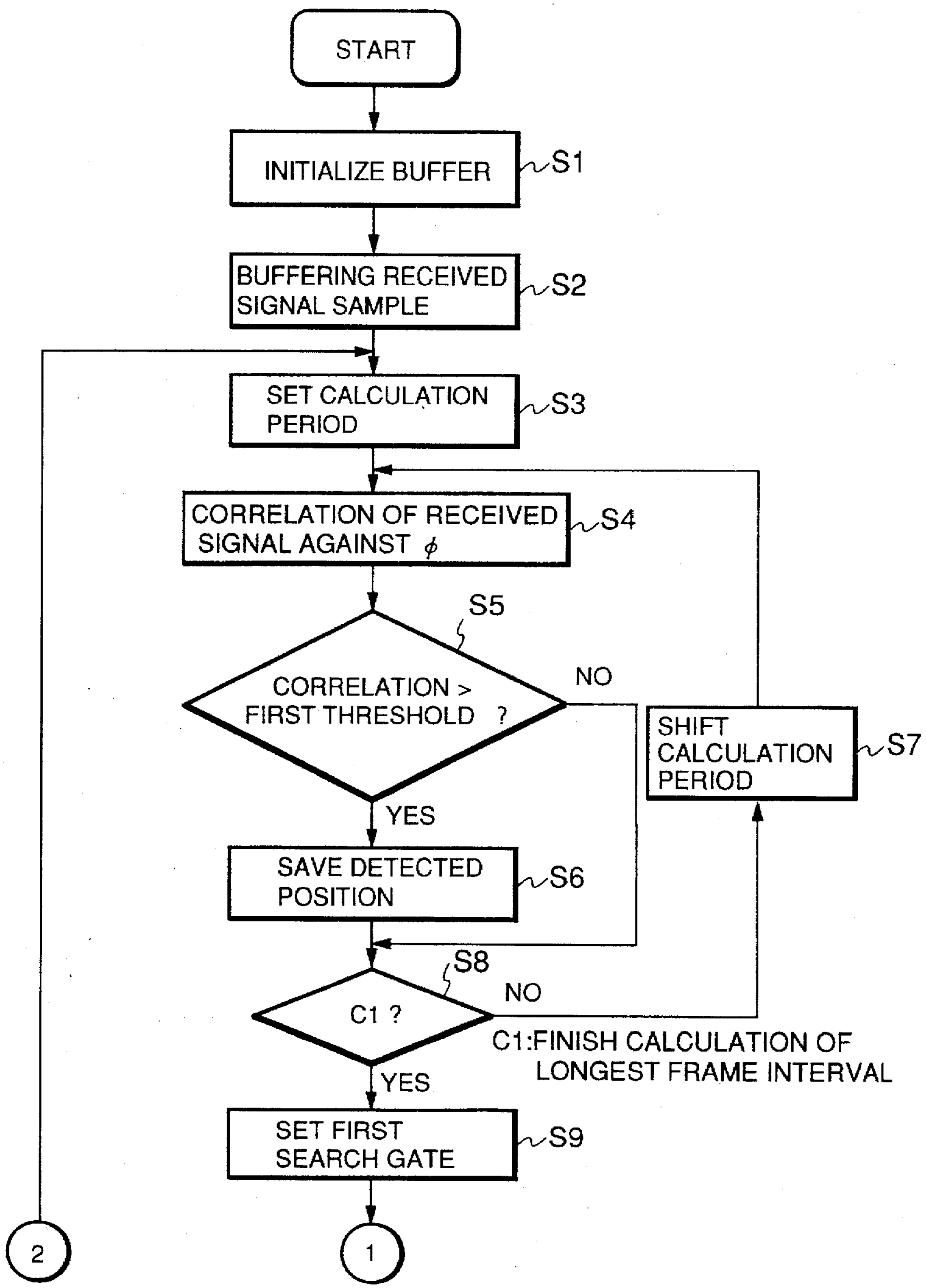
FIGS. 3(*a*) and 3(*b*) are diagrams showing a flowchart representing an operation of the frame synchronization apparatus shown in FIG. 2, wherein FIGS. 3(*a*) and 3(*b*) are connected as shown in FIG. 3(*c*)
Figure 3B:
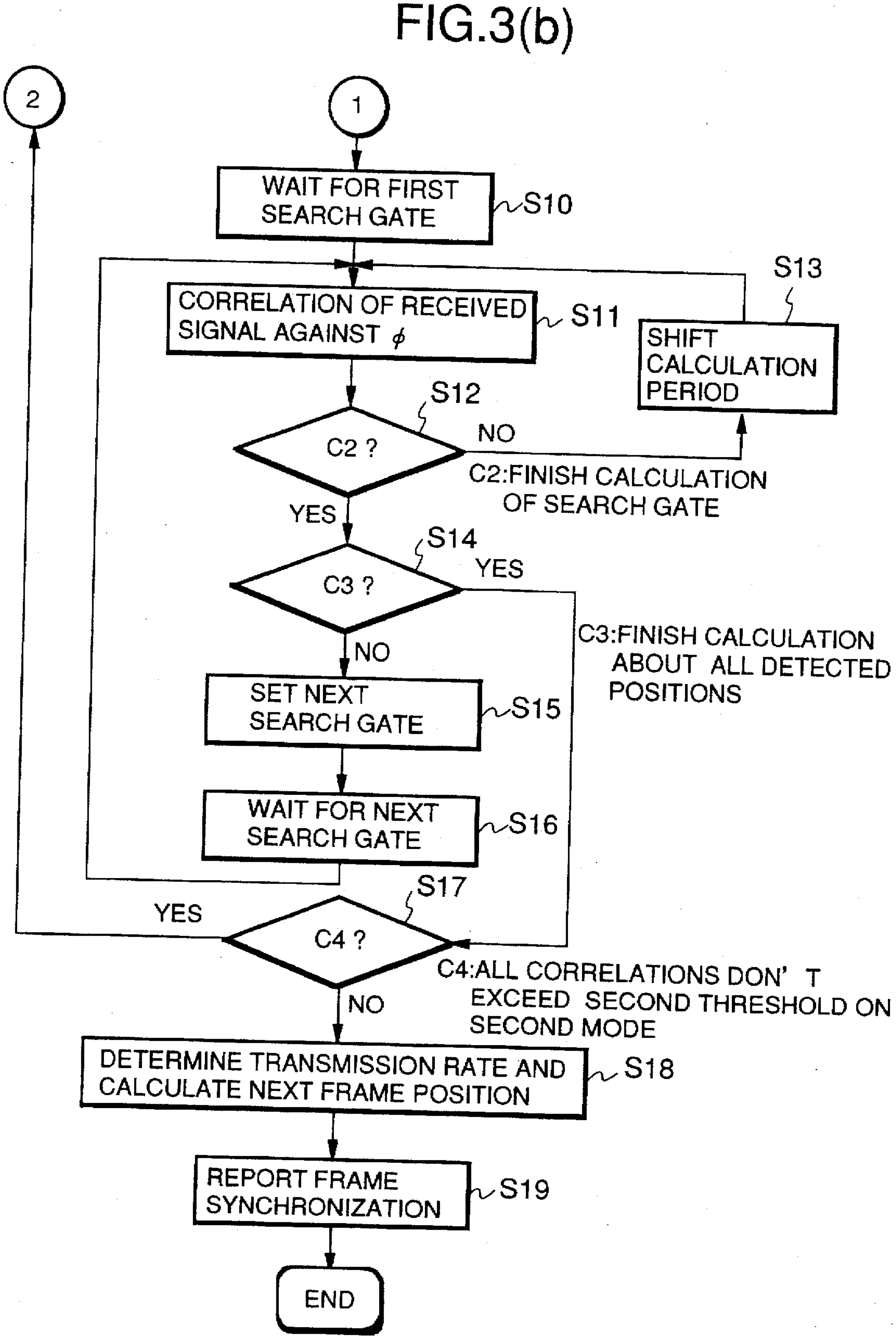
Figure 3C:
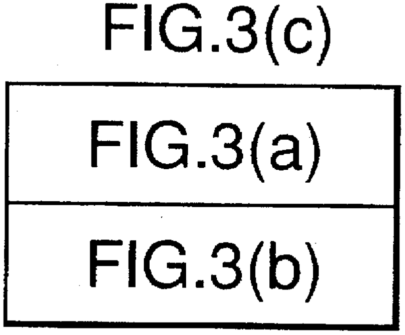

Hereinbelow, the procedure of this preferred embodiment will be described using FIGS. 3(*a*) and 3(*b*). As appreciated, FIGS. 3(*a*) and 3(*b*) are connected as shown in FIG. 3(*c*) to form an overall flowchart.

[First Search Mode Process]

At step S1, the mode switcher 14 initializes the buffer 12. At step S2, the sampled values of the received signal outputted from the A/D converter 11 are stored in the buffer 12. At step S3, a correlation calculation period of the received sequence where the correlation between the sync sequence $\phi$ of the assigned slot and the sampled sequence of the received signal is calculated is initially set. At step S4, the correlator 13 calculates the correlation between the sync sequence $\phi$ and the sampled sequence of the received signal in the set correlation calculation period. At step S5, the correlation and the first threshold are compared. If the correlation exceeds the first threshold, the routine proceeds to step S6. On the other hand, if the correlation does not exceed the first threshold, the routine proceeds to step S8.

At step S6, a position of the sampled sequence of the received signal where the correlation exceeds the first threshold is stored. At step S8, it is determined whether calculations corresponding to the longest frame period are finished. If not finished, the routine proceeds to step S7. On the other hand, if finished, the routine proceeds to step S9.

At step S7, the correlation calculation period of the received sequence is shifted by a period of the sampling clock. Then, the routine returns to step S4.

[Second Search Mode Process]

At step S9, a search gate is set at a position centering around a time point after a lapse of the longest frame period from a position where the correlation beyond the first threshold is first detected. Step S10 waits until sampled sequences of the received signal within the first search gate are stored in the buffer 12.

At step S11, a correlation between the sync sequence $\phi$ of the assigned slot and the sampled sequence of the received signal in the search gate is calculated. At step S12, it is determined whether calculations in the search gate are finished. If not finished, the routine proceeds to step S13. On the other hand, if finished, the routine proceeds to step S14.

At step S13, the correlation calculation period is shifted by a period of the sampling clock. Then, the routine returns to step S11.

At step S14, it is determined whether the calculations of correlations in the search gates corresponding to all the detected positions are finished. If not finished, the routine proceeds to step S15. On the other hand, if finished, the routine proceeds to step S17.

At step S15, the next search gate is set at a position centering around a time point after a lapse of the longest frame period from the subsequent detected position. At step S16, sampled sequences of the received signal within the next search gate are stored in the buffer 12. When the sampled sequences of the received signal are stored in the buffer 12, the routine returns to step S11.

At step S17, it is determined whether the correlations in all the search gates in the second mode do not exceed the second threshold, that is, whether there are no correlations exceeding the second threshold in the second mode. If no correlations exceed the second threshold in the second mode, the routine returns to step S3. On the other hand, if there is at least one correlation which exceeds the second threshold, the routine proceeds to step S18.

[Transmission Rate Determining Process]

At step S18, based on a time interval between detected positions of the correlations exceeding the second threshold, the transmission rate actually used is determined from the plurality of transmission rates available. Further, a head position of the next frame is calculated based on the determined transmission rate and the detected position where the correlation exceeds the second threshold.

At step S19, the control circuit 1 is notified of the establishment of frame synchronization and the head position of the next frame to.

Figure 4:
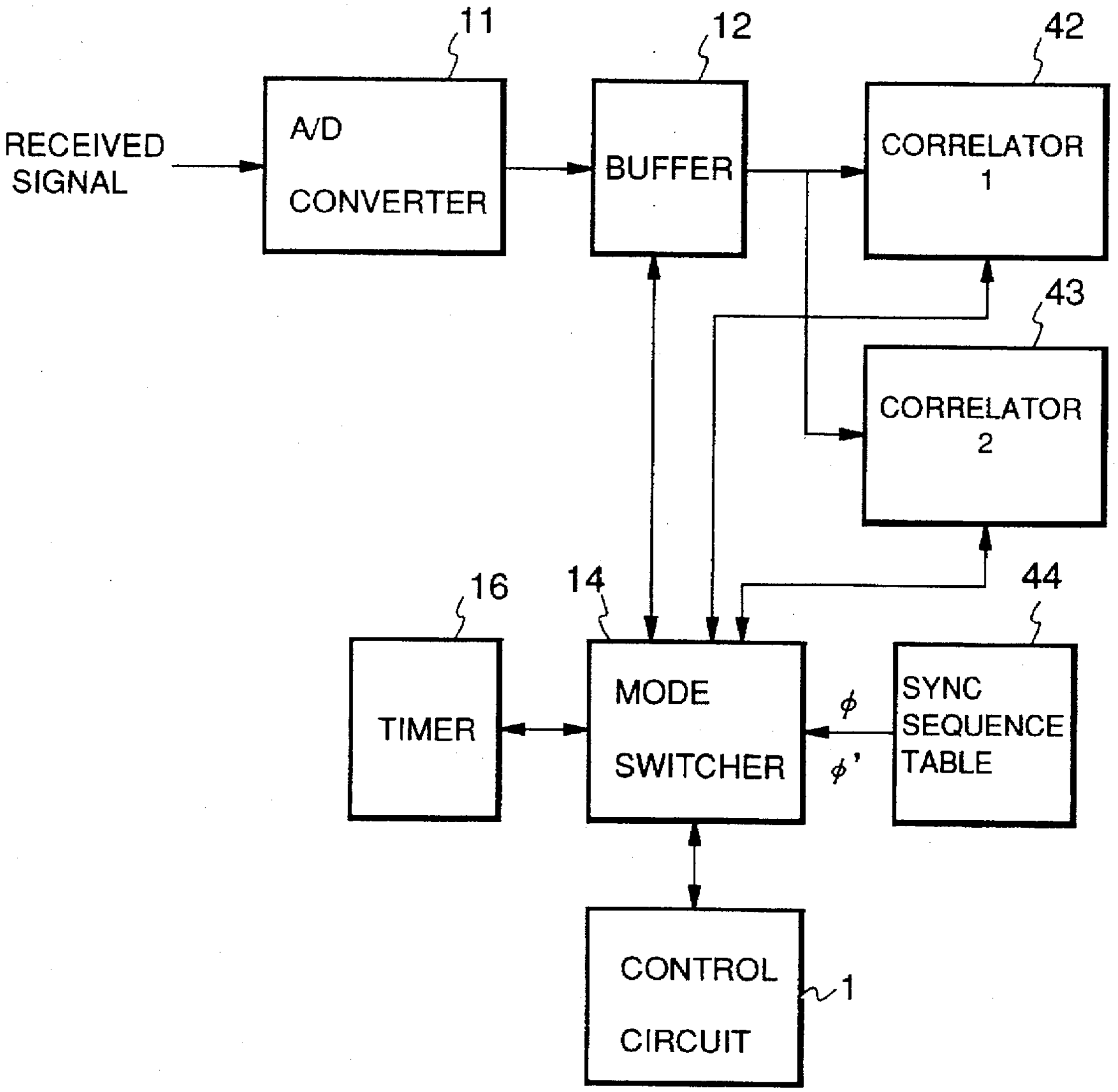
FIG. 4 is a block diagram showing a frame synchronization apparatus according to a second preferred embodiment of the present invention.

FIG. 4 is a structural diagram showing a frame synchronization apparatus according to a second preferred embodiment of the present invention. In FIG. 4, those components common to those shown in FIG. 2 are assigned the same reference signs. In this preferred embodiment, the output of the buffer 12 is fed to correlators 42 and 43.

When the signal is received from the base station (not shown), the control circuit 1 instructs the mode switcher 14 to start the frame synchronization. In response to this instruction, the mode switcher 14 is set to a first mode where the mode switcher 14 initializes the buffer 12 and waits until a sampled sequence of the received signal having a length necessary for calculation of a correlation is stored in the buffer 12.

When the data is stored in the buffer 12, the mode switcher 14 reads out a pattern of a sync sequence $\phi$ of an assigned slot from a sync sequence table 44 and sets the sync sequence $\phi$ in the correlator 42. Then, the mode switcher 14 instructs the correlator 42 to calculate a correlation between the set sync sequence $\phi$ and the sampled sequence of the received signal.

Every time new received data is inputted to the buffer 12, the correlator 42 shifts a correlation calculation period by a period of the sampling clock and calculates a correlation between the sync sequence $\phi$ and a sampled sequence of the received signal at the calculation period. The calculation result is provided to the mode switcher 14.

Every time the calculation result, that is, the value of correlation, is provided from the correlator 42, the mode switcher 14 determines whether the notified value exceeds a preset first threshold. If the correlation exceeds the first threshold, the mode switcher 14 stores a detected position thereof.

The foregoing processes are repeated during the longest frame period T2. After a lapse of the longest frame period T2, the mode switcher 14 is set to a second mode.

In the second mode, the mode switcher 14 first stops the operation of the correlator 42, and then performs the following processes: Specifically, the mode switcher 14 sets the sync sequence $\phi$ in the correlator 42 and a sync sequence $\phi'$ represented by the following equation (1) in the correlator 43, respectively:

$$\phi'=\phi 2((s2+N1)\bmod N2) \quad (1)$$

wherein $\phi=\phi 2\ (s2)$

Further, the mode switcher 14 sets a search gate at a position centering around a time point after a lapse of the shortest frame period from each of all the detected positions where the correlations exceed the first threshold in the first mode. Specifically, the search gate has a given time width across, that is, before and after, the time point after a lapse of T1 from the corresponding detected position.

The correlators 42 and 43 calculate correlations between the set sync sequences $\phi$ and $\phi'$ and sampled sequences of the received signal for calculation periods in all the search gates. These calculations are performed, as in the first mode, shifting the correlation calculation period per period of the sampling clock. The correlators 42 and 43 notify the calculated correlations to the mode switcher 14, respectively.

When the correlators 42 and 43 finish the calculations of correlations for the calculation periods in all the search gates, the mode switcher 14 stops the operations of the correlators 42 and 43.

The mode switcher 14 then determines whether the correlations calculated by the correlators 42 and 43 exceed a preset second threshold. The mode switcher 14 determines a detection interval of correlations exceeding the second threshold and further determines which of the sync sequences $\phi$ and $\phi'$ was used upon detection of the correlation beyond the second threshold.

If the sync sequence $\phi$ was used upon such detection, the frame period can be determined to be T1. On the other hand, if the sync sequence $\phi'$ was used upon such detection, the frame period can be determined to be T2. Then, the mode switcher 14 determines the transmission rate and notifies the control circuit 1 that the frame synchronization Is established. Upon the notification, the determined transmission rate is also provided. Further, a head position of the next frame Is calculated and provided.

Hereinbelow, the operation of this preferred embodiment will be described In detail using FIGS. 5(*a*) and 5(*b*). As appreciated, FIGS. 5(*a*) and 5(*b*) are connected like FIGS. 3(*a*) and 3(*b*) to form an overall flowchart.

[First Search Mode Process]

Figure 5A:
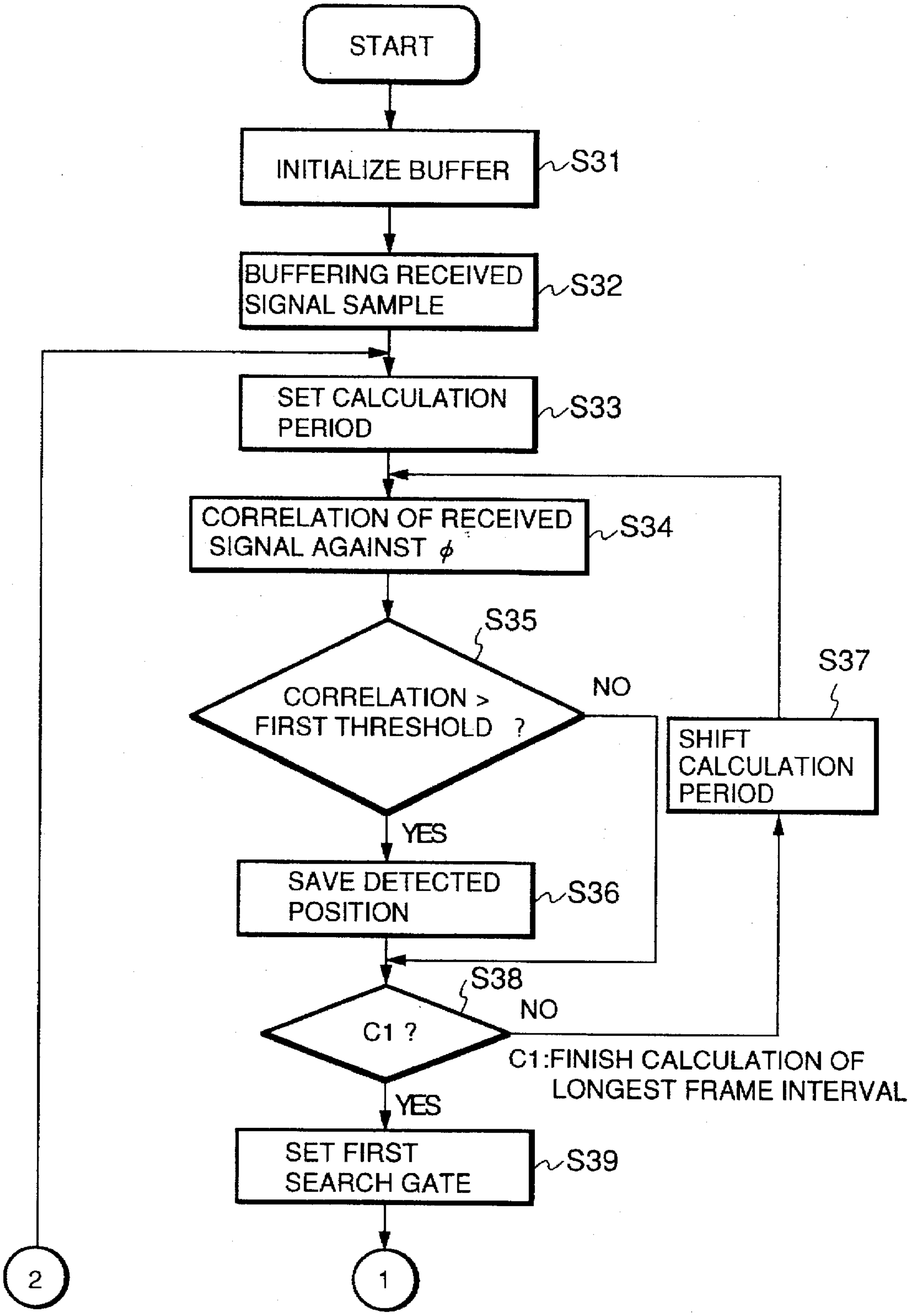
FIGS. 5(*a*) and 5(*b*) are diagrams showing a flowchart representing an operation of the frame synchronization apparatus shown in FIG. 4, according to the second preferred embodiment.
Figure 5B:
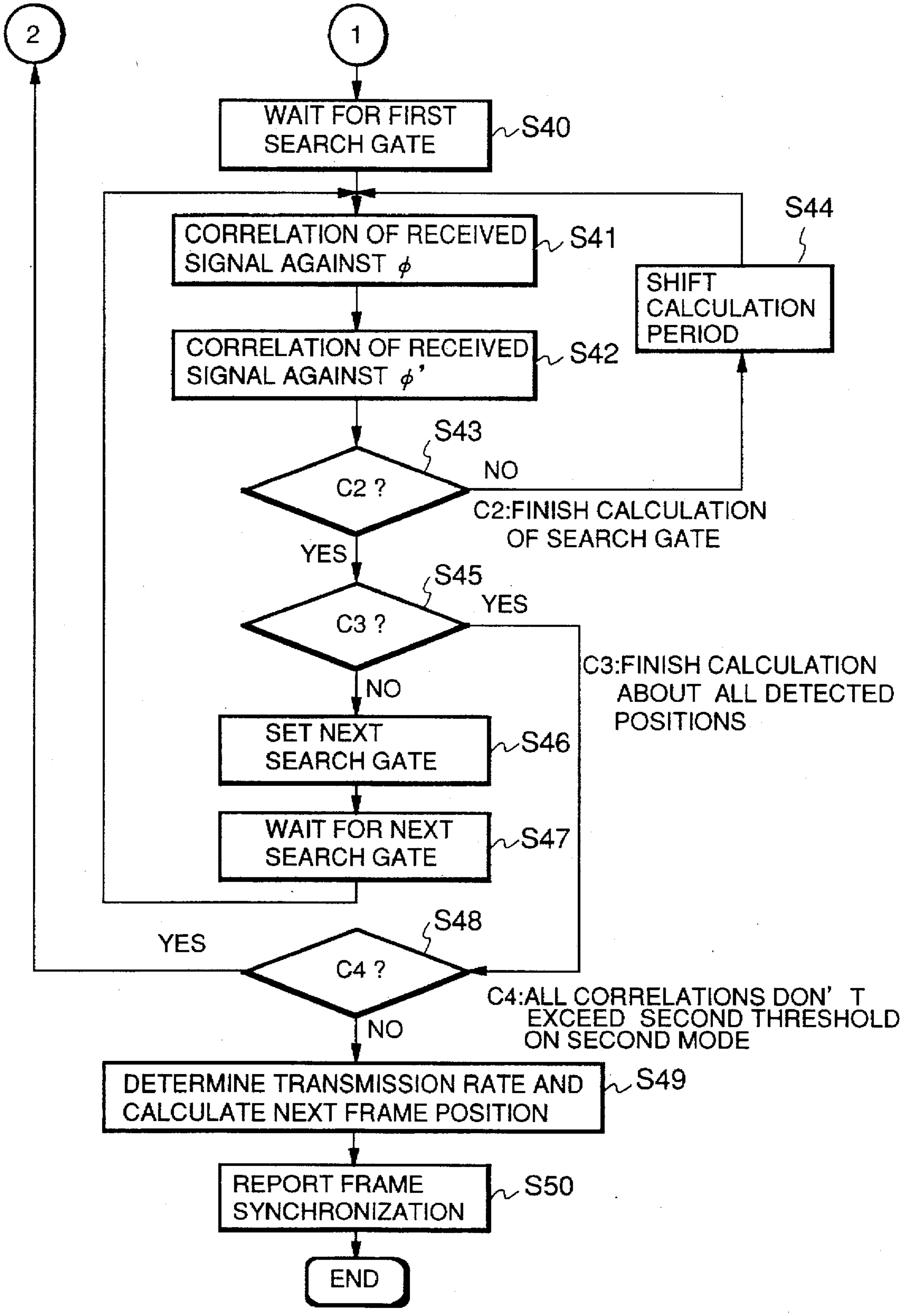

Steps S31 to S38 in FIG. 5(*a*) execute processes like steps S1 to S8 in FIG. 3(*a*) so as to achieve the first search mode process.

[Second Search Mode Process]

At step S39, a search gate is set at a position centering around a time point after a lapse of the shortest frame period from a position where the correlation beyond the first threshold is first detected. Step S40 waits until sampled sequences of the received signal within the first search gate are stored in the buffer 12.

At step S41, a correlation between the sync sequence $\phi$ and the sampled sequence of the received signal in the search gate is calculated. At step S42, a correlation between the sync sequence ϕ' represented by the equation (1) and the sampled sequence of the received signal in the search gate, which is the same as the sampled sequence used at step S41, is calculated. At step S43, it is determined whether calculations of correlations in the search gate are finished. If not finished, the routine proceeds to step S44. On the other hand, if finished, the routine proceeds to step S45.

At step S44, the correlation calculation period in the search gate is shifted by a period of the sampling clock. Then, the routine returns to step S41.

At step S45, it is determined whether the calculations of correlations in the search gates corresponding to all the detected positions, where the correlations exceed the first gate, are finished. If not finished, the routine proceeds to step S46. On the other hand, if finished, the routine proceeds to step S48.

At step S46, the next search gate is set at a position centering around a time point after a lapse of the shortest frame period from the subsequent detected position. At step S47, sampled sequences of the received signal within the next search gate are stored in the buffer 12. When the sampled sequences of the received signal are stored in the buffer 12, the routine returns to step S41.

At step S48, It Is determined whether the correlations in all the search gates calculated at steps S41 and S42 do not exceed the second threshold, that is, whether there are no correlations exceeding the second threshold in the second mode. If no correlations exceed the second threshold in the second mode, the routine returns to step S33. On the other hand, if there is at least one correlation which exceeds the second threshold, the routine proceeds to step S49.

[Transmission Rate Determining Process]

At step S49, based on a time interval between positions where the correlations exceeding the second threshold were detected and the sync sequence which was used for such detection, the transmission rate actually used is determined. Further, a head position of the next frame is calculated based on the detected position where the correlation exceeds the second threshold and the used sync sequence.

Finally, at step S50, the control circuit 1 is notified by the establishment of frame synchronization.

Figure 6:
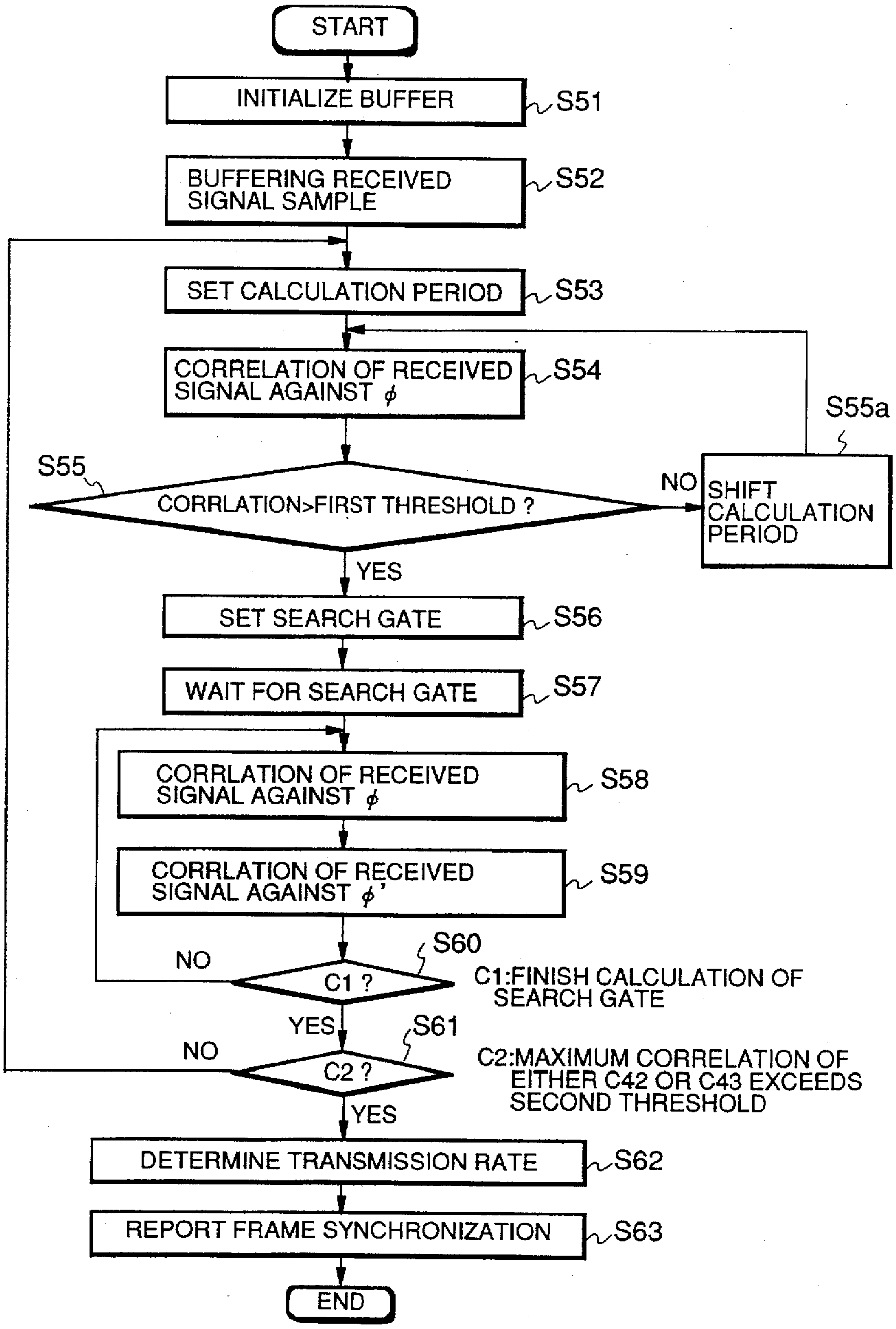
FIG. 6 is a diagram showing a flowchart representing another operation of the frame synchronization apparatus shown in FIG. 4, according to a third preferred embodiment of the present invention.

Now, a third preferred embodiment of the present invention will be described hereinbelow. In the third preferred embodiment, the hardware structure is the same as that in the second preferred embodiment. Using FIG. 6, an operation of the third preferred embodiment will be described.

[First Search Mode Process]

In the third preferred embodiment, like steps S1 to S3 in FIG. 3(*a*), the initial setting of a correlation calculation period is executed (steps S51 to S53).

At step S54, the mode switcher 14 instructs the correlator 42 to calculate a correlation C42 between a set sync sequence ϕ of an assigned slot and a sampled sequence of the received signal.

Every time new received data is inputted to the buffer 12, the correlator 42 shifts a correlation calculation period by a period of the sampling clock and calculates a correlation C42 between the sync sequence ϕ and a sampled sequence of the received signal at the calculation period. The switcher 14 is notified of the calculation result.

At step S55, the mode switcher 14 determines whether the correlation C42 received from the correlator 42 exceeds a present first threshold. If the correlation C42 exceeds the first threshold, the mode switcher 14 is set to a second mode. On the other hand, if the correlation C42 does not exceed the first threshold, the routine proceeds to step S55*a*. At step S55*a*, the correlation calculation period is shifted. Then, the routine returns to step S54.

[Second Search Mode Process]

The mode switcher 14 set to the second mode first stops the operation of the correlator 42. Subsequently, the mode switcher 14 sets a search gate at a position centering around a time point after a lapse of the shortest frame period from a detection timing where the correlation C42 exceeds the first threshold in the first mode. Specifically, the mode switcher 14 sets the search gate having a given time width across, that is, before and after, the time point after a lapse of T1 from the detection timing (steps S56 and S57).

At steps S58 and S59, the mode switcher 14 sets the sync sequence ϕ in the correlator 42 and the sync sequence ϕ' in the correlator 43, respectively, and then initializes the buffer 12.

After data having a length necessary for the correlation calculation is stored in the buffer 12, the mode switcher 14 instructs the correlators 42 and 43 to calculate correlations, respectively. The correlator 42 calculates the correlation C42 between the set sync sequence ϕ and the sampled sequence of the received signal. On the other hand, the correlator 43 calculates a correlation C43 between the set sync sequence ϕ' and the sampled sequence of the received signal. These calculations are performed, as in the first mode, shifting the correlation calculation period per period of the sampling clock. The correlators 42 and 43 notify the mode switcher 14 of the calculated correlations C42 and C43, respectively.

At step S60, the mode switcher 14 determines whether calculations of correlations in the search gate are finished. If not finished, the routine returns to step S58. On the other hand, if finished, the routine proceeds to step S61.

[Comparison Process]

At step S61, the maximum values C42max and C43max of the correlations C42 and C43 calculated by the correlators 42 and 43 are derived, respectively. Then, the maximum values C42max and C43max are compared with a preset second threshold, respectively, so as to determine whether either of C42max and C43max exceeds the second threshold. If either of C42max and C43max exceeds the second threshold, the routine proceeds to step S62. On the other hand, if neither of C42max and C43max exceeds the second threshold, the routine returns to step S53 to repeat the foregoing processes.

[Transmission Rate Determining Process]

At step S62, the transmission rate is determined based on the sync sequence ϕ or ϕ' used by the correlator 42 or 43 which calculated the correlation C42max or C43max exceeding the second threshold. Then, at step S63, the control circuit 1 is notified of the establishment of frame synchronization.

Figure 7:
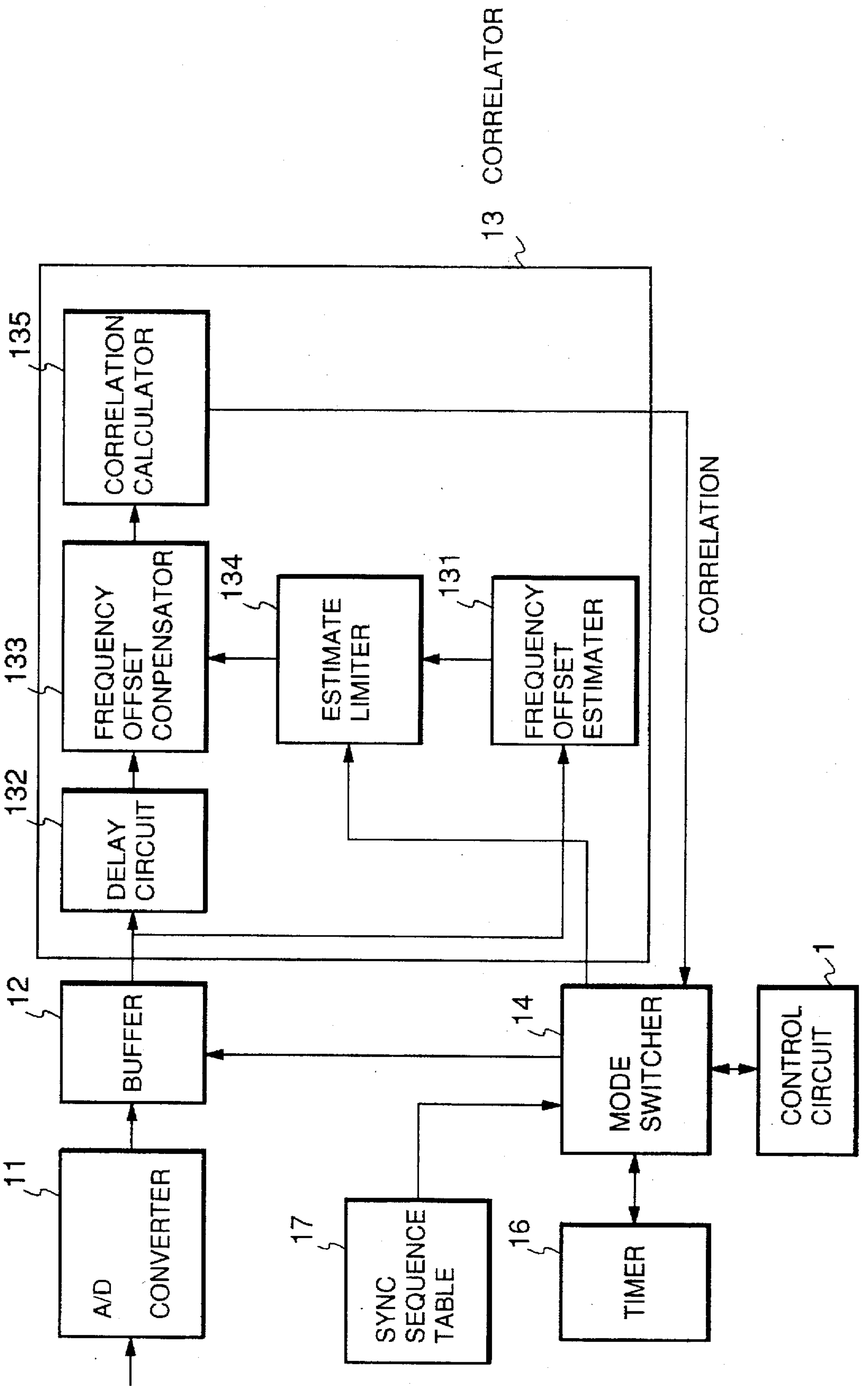
FIG. 7 is a block diagram showing a structure of a correlator applied to the frame synchronization apparatus in the first preferred embodiment.

Hereinbelow, a structure of the correlator will be described in detail using FIG. 7, wherein the correlator is applied to the frame synchronization apparatus in the first preferred embodiment.

The received signal from the buffer 12 is fed to a frequency offset estimator 131 and simultaneously to a frequency offset compensator 133 via a delay circuit 132. The frequency offset estimator 131 estimates a frequency offset of the inputted received signal. A value of the estimated frequency offset Is fed to the frequency offset compensator 133 via an estimate limiter 134.

The frequency offset compensator 133 compensates for a frequency offset of the received signal based on the estimated frequency offset inputted from the estimate limiter 134. An output of the frequency offset compensator 133 is given to a correlation calculator 135.

The correlation calculator 135 calculates a correlation using the sync sequence and the received signal which has been compensated in frequency offset. The mode switcher 14 is notified of the calculation result.

The frequency offset estimated at the frequency offset estimator 131 is limited at the estimate limiter 134. This limited value is inputted to the frequency offset compensator 133. The control circuit 1 determines a limiter value based on the carrier frequency stability at both transmitter and receiver sides and information about the frequency band. This limiter value is fed to the estimate limiter 134 via the mode switcher 14 at the start of conversation or at the time of hand-off. By using the estimate limiter 134, abnormal estimated frequency offset values can be excluded in advance. Thus, the frame synchronization can be prevented from being established in error.

Figure 8:
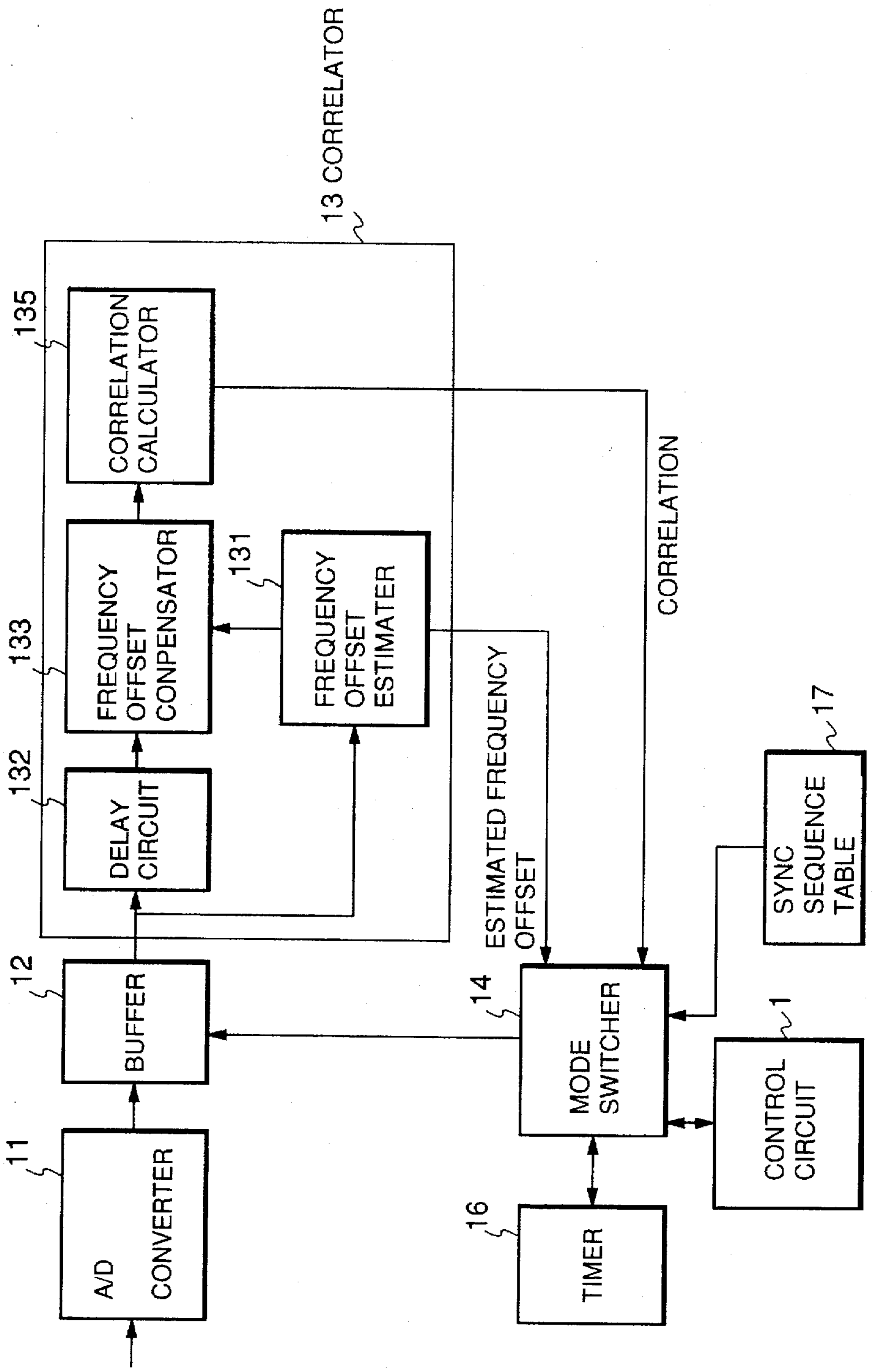
FIG. 8 is a block diagram showing a structure of another correlator applied to the frame synchronization apparatus in the first preferred embodiment.

FIG. 8 shows another structure of the correlator applied to the frame synchronization apparatus in the first preferred embodiment.

The received signal from the buffer 12 is fed to the frequency offset estimator 131 and simultaneously to the frequency offset compensator 133 via the circuit 132. The frequency offset estimator 131 estimates a frequency offset of the inputted received signal. A value of the estimated frequency offset is fed to the frequency offset compensator 133 and simultaneously to the mode switcher 14.

The frequency offset compensator 133 compensates for a frequency offset of the received signal based on the estimated frequency offset inputted from the frequency offset estimator 131. An output of the frequency offset compensator 133 is given to the correlation calculator 135.

The correlation calculator 135 calculates a correlation using the sync sequence and the received signal which has been compensated in frequency offset. The correlation calculation result is notified to the mode switcher 14.

Every time the correlation calculation result is output from the correlation calculator 135, the mode switcher 14 compares the notified calculation result with a preset threshold. If the calculation result exceeds the threshold, the mode switcher 14 reads out a corresponding estimated frequency offset from the frequency offset estimator 131 and stores it.

As described before, the correlation calculation result is output to the mode switcher 14 from the correlator 13. When the mode switcher 14 is set to the first mode, the mode switcher 14 compares the calculation result with the first threshold. If the calculation result exceeds the first threshold, the mode switcher 14 reads out a corresponding estimated frequency offset f1 from the frequency offset estimator 131 and stores it. On the other hand, when the mode switcher 14 is set to the second mode, the mode switcher 14 compares the calculation result with the second threshold. If the calculation result exceeds the second threshold, the mode switcher 14 reads out a corresponding estimated frequency offset f2 from the frequency offset estimator 131 and stores it.

The mode switcher 14 then derives a difference between the estimated frequency offset f1 and the estimated frequency offset f2 at each of the corresponding detection points where the correlation calculation result exceeds the first threshold In the first mode. If this difference is greater than the second threshold, it is highly possible that the wrong correlation has been detected due to the Doppler shift of frequency, the frequency offset or the like. Thus, this detection point is ignored for the establishment of synchronization.

What is claimed is:

1. A frame synchronization apparatus of a receiver for use in a TDMA communication system which has a plurality of transmission rates and which receives data at transmission rates that are unidentified at a time of receipt of the data, comprising:

correlation means for correlating between an assigned sync sequence and a received sync sequence; and mode control means, connected to the correlation means, for switching between a first mode and a second mode, wherein the mode control means memorizes all positions at which correlations are beyond a first threshold, and in the second mode the mode control means determines the unidentified transmission rate of currently received data by comparing correlations with a second threshold.

2. A frame synchronization apparatus of a receiver for use in a TDMA communication system which has a plurality of transmission rates, comprising:

correlation means for correlating between an assigned sync sequence and a received sync sequence; and mode control means, connected to the correlation means, for switching between a first mode and a second mode, wherein in the first mode the mode control means memorizes all positions at which correlations are beyond a first threshold, and in the second mode the mode control means determines frame synchronization by comparing correlations with a second threshold, wherein the mode control means memorizes the correlations during a longest frame period in the first mode, sets a search gate about each of the memorized positions, and determines whether the correlation of each search gate is beyond the second threshold.

3. A frame synchronization apparatus according to claim 2, wherein each of the search gates is set after the longest frame period of each of the memorized positions.

4. A frame synchronization apparatus according to claim 2, wherein each of the search gates is set after a shortest frame period of each of the memorized positions.

5. A frame synchronization apparatus of a receiver for use in a TDMA communication system which has a plurality of transmission rates, comprising:

correlation means for correlating between an assigned sync sequence and a received sync sequence; and mode control means, connected to the correlation means, for switching between a first mode and a second mode, wherein in the first mode the mode control means memorizes all positions at which correlations are beyond a first threshold, and in the second mode the mode control means determines frame synchronization by comparing correlations with a second threshold, wherein the mode control means memorizes the correlation during a shortest frame period in the first mode, sets a search gate about the memorized position, and determines whether the correlation of the search gate is beyond the second threshold.

6. A frame synchronization apparatus of a receiver for use in a TDMA communication system which has a plurality of transmission rates, comprising:

correlation means for correlating between an assigned sync sequence and a received sync sequence;

first mode setting means for memorizing all positions at which correlations are beyond a first threshold during a predetermined period of time;

gate setting means for setting search gates about all of the positions memorized in a first mode;

second mode setting means for comparing the correlation with a second threshold about each of the search gates; and determining means for determining a current transmission rate among the plurality of transmission rates.

7. A frame synchronization apparatus according to claim 6, wherein the first mode setting means memorizes the positions during a longest frame period, and the gate setting means sets the search gate after the longest frame period of each of the memorized positions.

8. A frame synchronization apparatus according to claim 6, wherein the first mode setting means memorizes the positions during a longest frame period, and the gate setting means sets the search gate after a shortest frame period of each of the memorized positions.

9. A frame synchronization apparatus according to claim 6, wherein the correlation means comprises:

a frequency offset estimator for estimating a frequency offset of a received signal;

a frequency offset compensator connected to the frequency offset estimator for compensating for a frequency offset of the received signal by using the estimated frequency offset provided from the frequency offset estimator; and a correlation calculator for calculating the correlation between the assigned sync sequence and the received sync sequence of the received signal.

10. A frame synchronization apparatus according to claim 9, wherein the correlation means further comprises an estimate limiter provided at an output side of the frequency offset estimator.

11. A method for frame synchronization for use in a TDMA communication system which has a plurality of transmission rates, comprising the steps of:

(a) in a first mode:

calculating first correlations between an assigned sync sequence and received sync sequences for a predetermined period;

memorizing all positions at which the correlations are beyond a first threshold; and setting a search gate about each of the memorized positions;

(b) in a second mode:

calculating second correlations between the assigned sync sequence and received sync sequences for all the search gates; and determining whether the second correlation is beyond a second threshold, thereby obtaining frame synchronization.

12. A frame synchronization apparatus of a receiver for use in a TDMA communication system which has a plurality of transmission rates, comprising:

correlation means for correlating between an assigned sync sequence and a received sync sequence; and mode control means, connected to the correlation means, for switching between a first mode and a second mode, wherein in the first mode the mode control means memorizes all positions at which correlations are beyond a first threshold, and in the second mode the mode control means determines frame synchronization by comparing correlations with a second threshold, wherein the mode control means memorizes the correlations during a longest frame period in the first mode, in the second mode sets a search gate about each of the memorized positions and determines whether the correlation of each search gate is beyond the second threshold.

13. A frame synchronization apparatus according to claim 12, wherein each of the search gates is set after the longest frame period of each of the memorized positions.

14. A frame synchronization apparatus according to claim 12, wherein each of the search gates is set after a shortest frame period of each of the memorized positions.

15. A frame synchronization apparatus of a receiver for use in a TDMA communication system which has a plurality of transmission rates, comprising:

correlation means for correlating between an assigned sync sequence and a received sync sequence; and mode control means, connected to the correlation means, for switching between a first mode and a second mode, wherein in the first mode the mode control means memorizes all positions at which correlations are beyond a first threshold, and in the second mode the mode control means determines frame synchronization by comparing correlations with a second threshold, wherein the mode control means memorizes the correlation during a shortest frame period in the first mode, in the second mode sets a search gate about the memorized position and determines whether the correlation of the search gate is beyond the second threshold.

* * * * *